US012625266B2

(12) United States Patent (10) Patent No.: US 12,625,266 B2

Ai et al. (45) Date of Patent: *May 12, 2026

(54) METHOD OF OPERATING A LIDAR SYSTEM FOR DETECTION OF GAS

(71) Applicant: QLM Technology Limited, Bristol (GB)

(72) Inventors: Xiao Ai, Bristol (GB); James Titchener, Bristol (GB); Alexander Dunning, Bristol (GB)

(73) Assignee: QLM Technology Limited, Bristol (GB)

( * ) Notice: Subject to any disclaimer, the term of this patent is extended or adjusted under 35 U.S.C. 154(b) by 878 days.

This patent is subject to a terminal disclaimer.

(21) Appl. No.: 17/806,039

(22) Filed: Jun. 8, 2022

(65) Prior Publication Data

US 2023/0161042 A1 May 25, 2023

Related U.S. Application Data

(60) Provisional application No. 63/202,375, filed on Jun. 8, 2021.

(51) Int. Cl.
*G01S 17/88* (2006.01)
*G01M 3/04* (2006.01)
(Continued)

(52) U.S. Cl.
CPC .............. *G01S 17/88* (2013.01); *G01M 3/04* (2013.01); *G01N 21/3504* (2013.01);
(Continued)

(58) Field of Classification Search
CPC .......... G01S 17/88; G01S 17/04; G01S 17/32; G01S 7/4817; G01S 7/493; G01S 7/4972;
(Continued)

(56) References Cited

U.S. PATENT DOCUMENTS 6,822,742 B1 11/2004 Kalayeh et al.
8,010,300 B1 8/2011 Stearns et al.
(Continued)

FOREIGN PATENT DOCUMENTS

GB 2586075 2/2022
WO 2019013698 A1 1/2019
(Continued)

OTHER PUBLICATIONS

U.S. Appl. No. 17/811,317, Office Action, 9 pages, Dec. 19, 2022.
(Continued)

*Primary Examiner* — Daniel L Murphy
(74) *Attorney, Agent, or Firm* — Haynes Beffel & Wolfeld LLP; Andrew L. Dunlap; Franklin M. Schellenberg

(57) ABSTRACT

A lidar system for detection of a gas comprises an optical transceiver for transmitting and receiving optical radiation. A method of operating the system comprises performing spatially scanned sensing measurements of the gas across a system field of view, and analyzing the sensing measurements to determine the presence and location of excess of the gas in the system field of view. Based on the determined location, an adjusted system field of view is determined and spatially scanned sensing measurements of the gas are performed across the adjusted system field of view to obtain sensing measurements at higher spatial resolution.

11 Claims, 17 Drawing Sheets

(51) Int. Cl.

| | |
|---|---|
| *G01N 21/3504* | (2014.01) |
| *G01N 21/39* | (2006.01) |
| *G01N 21/53* | (2006.01) |
| *G01S 7/481* | (2006.01) |
| *G01S 7/493* | (2006.01) |
| *G01S 7/497* | (2006.01) |
| *G01S 17/04* | (2020.01) |
| *G01S 17/32* | (2020.01) |

(52) U.S. Cl.
CPC ........... *G01N 21/39* (2013.01); *G01N 21/532* (2013.01); *G01S 7/4817* (2013.01); *G01S 7/493* (2013.01); *G01S 7/4972* (2013.01); *G01S 17/04* (2020.01); *G01S 17/32* (2013.01)

(58) Field of Classification Search
CPC .. G01S 17/4802; G01N 21/532; G01N 21/39; G01N 21/3504; G01M 3/04
USPC ......................................................... 356/4.01
See application file for complete search history.

(56) References Cited

U.S. PATENT DOCUMENTS

| | | | |
|---|---|---|---|
| 8,121,798 | B2 | 2/2012 | Lippert et al. |
| 11,644,576 | B2 * | 5/2023 | Ai ........................... G01S 7/493 |
| | | | 356/4.01 |
| 11,714,047 | B2 | 8/2023 | Ai et al. |
| 12,066,353 | B2 | 8/2024 | Thorpe et al. |
| 2007/0061114 | A1 | 3/2007 | Kalayeh |
| 2017/0097274 | A1 | 4/2017 | Thorpe et al. |
| 2017/0097302 | A1 | 4/2017 | Kreitinger et al. |
| 2019/0178974 | A1 | 6/2019 | Droz |
| 2021/0055180 | A1 | 2/2021 | Thorpe et al. |
| 2022/0390361 | A1 | 12/2022 | Ai et al. |

FOREIGN PATENT DOCUMENTS

| | | |
|---|---|---|
| WO | 2019099567 A1 | 5/2019 |
| WO | 2019152787 A1 | 8/2019 |

OTHER PUBLICATIONS

"Marshall, G.F. ""Risley Prism Scan Patterns,"" SPIE Conference on Optical Scanning: Design and Application Denver Colorado, Jul. 1999, Proc. SPIE vol. 3787, pp. 74-86."

Ostaszewski et al. "Risley Prism Beam Pointer", in Free-Space Laser Communications VI, Sep. 1, 2006, Proc. of SPIE vol. 6304, 630406, 10 pages.

Chambers et al., "Direct Measurement of Fugitive Emissions of Hydrocarbons from a Refinery", Journal of the Air & Waste Management Association, Aug. 2008, vol. 58, No. 8, pp. 1047-1056, doi: 10.3155/1047-3289.58.8.1047.

Wainner et al., "Scanning, standoff TDLAS leak imaging and quantification", Next-Generation Spectroscopic Technologies X, SPIE, vol. 10210, 1021006, Jun. 13, 2017, doi: 10.1117/12.2264799, 11 pages.

Gardiner et al., "Field Validation of Remote Sensing Methane Emission Measurements", Remote Sensing, MDPI, Sep. 14, 2017, vol. 9, No. 9:956, doi: 10.3390/rs9090956, 10 pages.

Innocenti et al., "Differential Absorption Lidar (DIAL) Measurements of Landfill Methane Emissions", Remote Sensing, MDPI, Sep. 14, 2017, vol. 9, No. 9:953, doi: 10.3390/rs9090953, 11 pages.

Yang et al., "Natural Gas Fugitive Leak Detection Using an Unmanned Aerial Vehicle: Measurement System Description and Mass Balance Approach", Atmosphere, MDPI, Oct. 1, 2018, vol. 9, No. 9:383, doi: 10.3390/atmos9100383, 22 pages.

Li et al., "Single-photon imaging over 200 km", Optica, vol. 8, No. 3, Mar. 9, 2021, pp. 344-349.

Titchener et al., "Single photon Lidar gas imagers for practical and widespread continuous methane monitoring". Applied Energy, vol. 306, 118086, Oct. 31, 2021, 11 pages.

\* cited by examiner

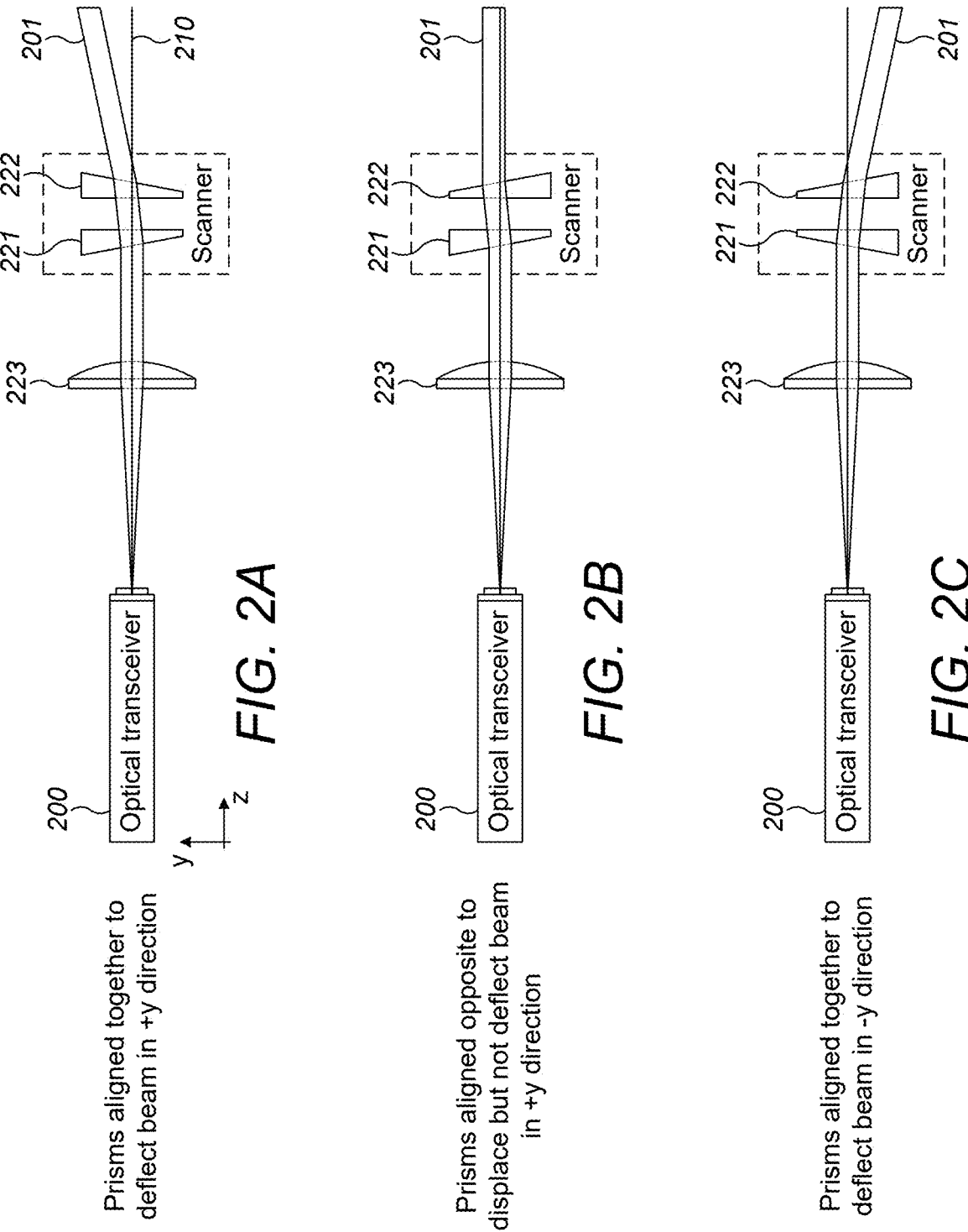

Prism 1 and 2 angles (radians)

Time (seconds)

Prism 1 (solid line) and Prism 2 (dotted line) rotation angles
(radians modulo 2pi) as a function of time (seconds)

Prism 1 and 2 angles (radians)

Time (seconds)

Prism 1 (solid line) and Prism 2 (dotted line) rotation angles
(radians modulo 2pi) as a function of time (seconds)

Prism 1 and 2 angles (radians)

Time (seconds)

Prism 1 (solid line) and Prism 2 (dotted line) rotation angles
(radians modulo 2pi) as a function of time (seconds)

Large field of view intensity, gas concentration pathlength, overlay 2x zoom field of view intensity, gas concentration pathlength, overlay 4x zoom field of view intensity, gas concentration pathlength, overlay

METHOD OF OPERATING A LIDAR SYSTEM FOR DETECTION OF GAS

CROSS REFERENCE TO RELATED APPLICATION

The present application claims the benefit of priority of U.S. Provisional Patent Application No. 63/202,375, filed Jun. 8, 2021, entitled METHOD OF SCANNING IN A LASER LIDAR SYSTEM, the entire disclosure of which is incorporated herein in its entirety by reference.

FIELD OF THE INVENTION

The present invention relates to a method of operating a lidar system for detection of a gas, for example a particular gas that might be present in an environment in a larger concentration than normal.

BACKGROUND

An example of a lidar system for gas detection is described in UK Patent Application Publication No. GB2586075A by J. Titchener and X. Ai, entitled "Rapidly tunable diode lidar" and published 3 Feb. 2021 ("GB2586075A"), which uses a tuned laser wavelength to detect a gas.

Some of the methods and systems described below are directed to improving the resolution of gas detection. Some of the methods and systems described below may solve other problems.

SUMMARY

There is provided in the following a method of operating a lidar system for detection of a gas, wherein the system comprises an optical transceiver for transmitting and receiving optical radiation. The method comprises performing spatially scanned sensing measurements of the gas across a system field of view; analyzing the sensing measurements to determine the presence and location of excess of the gas in the system field of view; based on the determined location, determining an adjusted system field of view and performing spatially scanned sensing measurements of the gas across the adjusted system field of view to obtain sensing measurements at higher spatial resolution.

There is also provided a system configured to perform the foregoing method. The method may be implemented by way of a computer readable medium.

BRIEF DESCRIPTION OF THE DRAWINGS

Embodiments of the invention will now be described by way of example only and with reference to the accompanying drawings in which:

FIGS. 2A-C are a series of diagrams illustrating how dual prisms may be used to steer an optical beam;

DETAILED DESCRIPTION OF ONE OR MORE EMBODIMENTS

Figure 1:
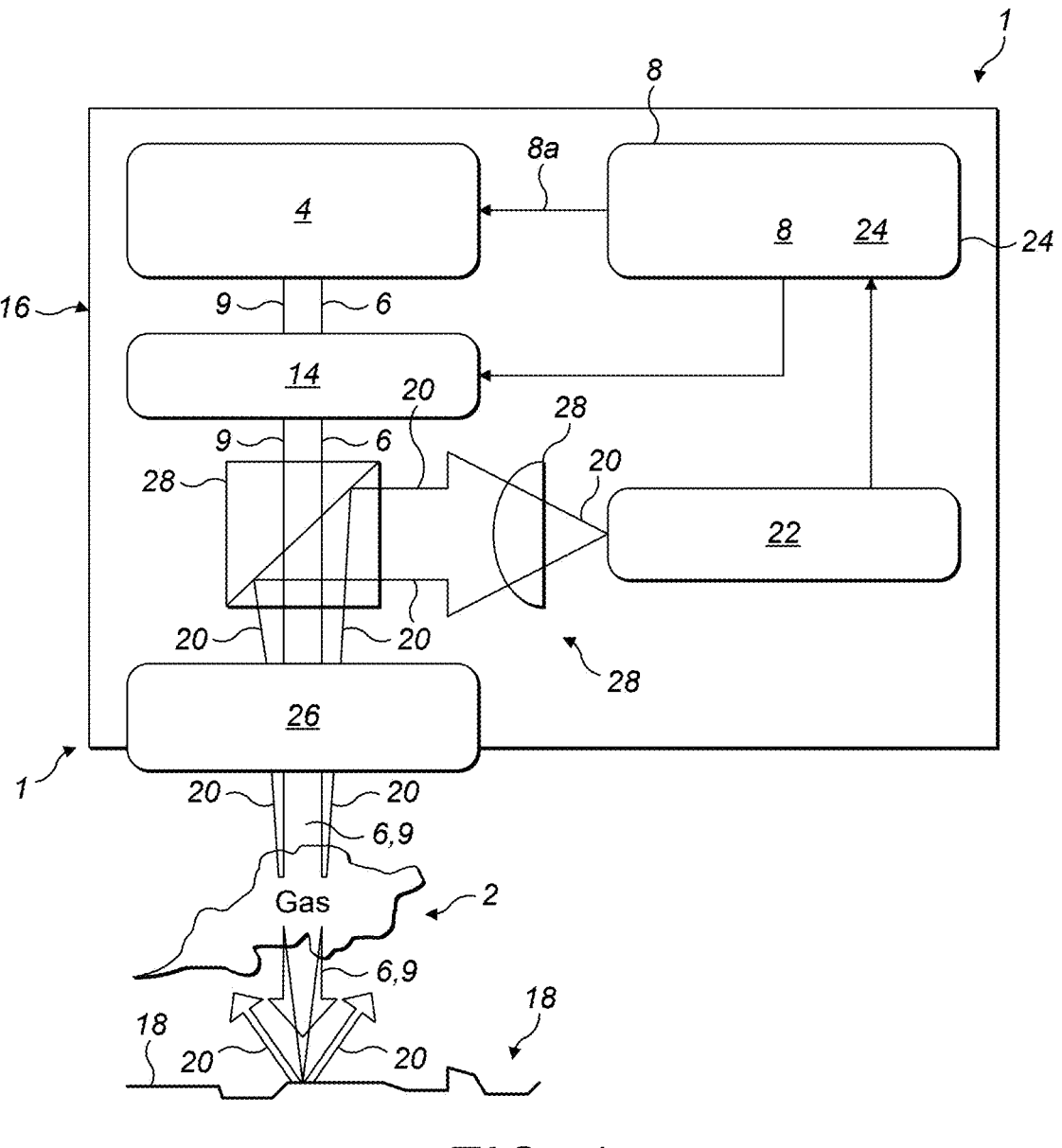
FIG. 1 is a schematic diagram of a lidar gas detection system in which any of the methods to be described here may be implemented.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention, and further permits the reasonable and logical inference of still other embodiments as would be understood by persons of ordinary skill in the art.

It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "various embodiments" or "preferably," refers to features and aspects that are present in at least one embodiment, but which are optional for some embodiments, it therefore being understood that use of the words "preferred" and/or "preferably" (and/or inflections thereof) implies the term "optional."

FIG. 1 is a schematic diagram of a lidar gas detection system in which any of the methods to be described here may be implemented. The optical device may be configured to detect one or more gases present in at least a part of the atmosphere. The, or each, substance may be at least one of: carbon dioxide ($CO_2$), nitrous oxide ($N_2O$), carbon monoxide (CO), ammonia (NH3), ethylene (C2H4) and methane (CH4). The system is described in more detail in GB2586075A, which is incorporated herein by reference.

As shown in FIG. 1, the gas detection system 1 is a gas detection device configured to detect the presence or concentration of at least one gas 2.

The gas detection system 1 includes a laser device 4 operable to output first output radiation 6 having a continuous wave output. The gas detection system 1 includes a control element 8 operable to tune a first emission wavelength 9 of the first output radiation 6 continuously within a first wavelength spectrum 10.

The control element 8 is operable to continuously tune the first emission 30 wavelength 9 within the first wavelength spectrum 10 and to perform multiple scans within the first wavelength spectrum 10. In this arrangement, the gas detection system 1 is operable to continuously vary the first wavelength spectrum 10, such that the emission wavelength 9 varies continuously over time. A gas may be detected in a number of ways as known to those skilled in the art, for example based on its characteristic transmission or absorption spectrum.

As shown in FIGS. 1 and 2A-C, the gas detection system 1 includes a modulator 14 operable to apply a first output modulation to the first output radiation 6.

The gas detection system 1 includes an optical system 26 operable to transmit the first output radiation 6 towards a first target location 18 and to collect/receive scattered radiation 20, the scattered radiation 20 having been at least partially modified by the gas 2 present in the first target location 18.

The gas detection system 1 includes a detector 22 configured to receive the scattered radiation 20 and a processing element 24 operable to process the received scattered radiation 20.

In the embodiments illustrated and described here, the gas detection system 1 is configured to detect the presence, or concentration, of the gas 2 in the atmosphere.

In the embodiments illustrated and described here, the gas detection system 1 is configured to detect the presence, or concentration, of the gas 2 when located remote from the gas detection system 1, at a distance of up to approximately 100 meters. However, it should be appreciated that the gas detection system 1 could be configured to detect the gas 2 at other distances. For example, the gas detection system 1 could be mounted to a satellite and configured to operate at distances of up to 100 km or more. Furthermore, the gas detection system could be configured to detect gas located within the gas detection system 1.

In an example implementation the gas detection system 1 is configured to detect methane (CH4), although the gas detection system 1 could be configured to detect one or more gases.

In use, the gas detection system 1 is operable to perform one or more scans of a target area or location 18. In this arrangement, the gas detection system 1 is operable to obtain spatially scanned sensing measurements of the gas across a system field of view.

As shown in FIG. 1, the gas detection system 1 is configured as a Lidar device.

In the embodiments illustrated and described here, the gas detection system 1 is operable to output the first output radiation 6 in the infrared region of the electromagnetic spectrum, specifically at a wavelength of between approximately 1.6506 pm and 1.6512 pm. However, in other embodiments the gas detection system 1 could be operable to output the first output radiation 6 in one or more regions of the electromagnetic spectrum.

The first output radiation 6 comprises a continuous wave (CW) output and the modulator 14 is operable to apply a first output random or quasi-random modulation (RM) (an example of first output modulation 16) to the first output radiation 6. In this arrangement, the gas detection system 1 is a CWRM device.

As shown in FIG. 1, the gas detection system 1 comprises a single laser device 4, and the emission wavelength 9 is continuously tuned within the wavelength spectrum 10, such that this single laser device 4 is used to generate both the "on" wavelength(s) and the "off" wavelength(s). That is, in this embodiment the gas detection system 1 does not require a plurality of laser devices 4 to scan the wavelength spectrum 10. It will be appreciated that in other embodiments, the gas detection system 1 could comprise a plurality of laser devices 4, used to scan multiple wavelength spectra 10 or, in some embodiments, to use more than one laser device 4 to scan within a particular wavelength spectrum 10 (e.g. using one laser device 4 to emit an "off" wavelength and another laser device 4 to emit an "on" wavelength).

In the embodiments illustrated and described here, the gas detection system 1 includes a single optical system 26 operable to transmit the first output radiation 6 and to receive the scattered radiation 20. The optical system 26 may comprise a pair of prisms which may be driven, e.g. rotated, in manners to be described further below, to scan the laser beam 20 across a system field of view.

The gas detection system 1 may be configured to be mountable to a frame member, a vehicle, an aerial vehicle, and/or an unmanned vehicle, an unmanned aerial vehicle, and/or a helicopter.

As shown in FIG. 1, the gas detection system 1 includes one or more optical guide elements 28 configured to guide the received scattered radiation 20 to the, or each, detector 22.

The laser device 4 is a tuneable laser device 4. In the embodiment illustrated in FIG. 1, the first emission wavelength 9 of the laser device 4 is tuneable by adjusting, or modulating, the drive current of the laser device 4, which in this embodiment is controlled by the control element 8 sending a drive current modulation 8a to the laser device 4. It will be appreciated that in some embodiments, the laser drive current could be provided directly from the control element 8, or via ancillary drive circuitry.

FIGS. 2A-C are a series of diagrams illustrating how dual prisms, which may form part of the optical system 26 in the system of FIG. 1, may be used to steer a laser beam. The prisms are generally wedge shaped and the angle between their opposing major surfaces is referred to as the "wedge" angle.

Referring back to FIG. 1, the laser device 4, the detector 22 and guide elements 28 together form a transceiver that transmits radiation to a target location 18 and receives radiation from the target location via the optical system 26. The transceiver is represented by block 200 in FIG. 2. The optical system 26 may comprise a pair of prisms 221, 222, for example a Risley pair, which may be operated to cause a beam 201 passing through them, optionally via a lens 223, to scan a field of view.

In the following, examples using two prisms are described. However it should be noted that the methods and systems described here may use or comprise more than two prisms. For example equivalent effects to those achieved with two prisms may be achieved with more than two prisms, for example multiple pairs of prisms, or with moving mirrors.

FIG. 2A shows two prisms aligned, and arranged to deflect the optical beam 201 in the +y direction with respect to the transceiver axis z. The transceiver axis is the axis about which the prisms are designed to rotate and we will refer to both prisms being aligned as shown in FIG. 2A being at an angle of 0 degrees and as having a relative prism-to-prism angle of 0 degrees.

FIG. 2B shows two prisms aligned, arranged to displace but not deflect the beam 210 in the +y direction. The displacement has caused the optical beam 201 to travel along a path that is parallel to its original direction. We will refer to the first prism as being still at 0 degrees and the second prism as being at 180 degrees and the two prisms aligned opposite each other in this way as having a relative prism-to-prism angle, or relative prism angle in short, of 180 degrees.

FIG. 2C shows two prisms aligned, arranged to deflect the beam 201 in the −y direction. While both these prisms have rotated now to 180 degrees they have returned to a position where they again have a relative prism-to-prism angle of 0 degrees.

By comparing FIGS. 2A and 2C it can be seen that if the prisms are rotated about the transceiver axis z without varying the relative angle between the prisms, the beam can be made to move in a circular path.

It will be appreciated that by rotating one or both of the prisms in different ways the beam may be deflected in angle in different ways to scan different fields of view. The field of view defined by this prism rotation and optical beam scanning is termed the system field of view ("SFOV"). The instantaneous field of view of the transceiver, represented by the area of the beam 201, is termed the transceiver field of view.

Figure 10:
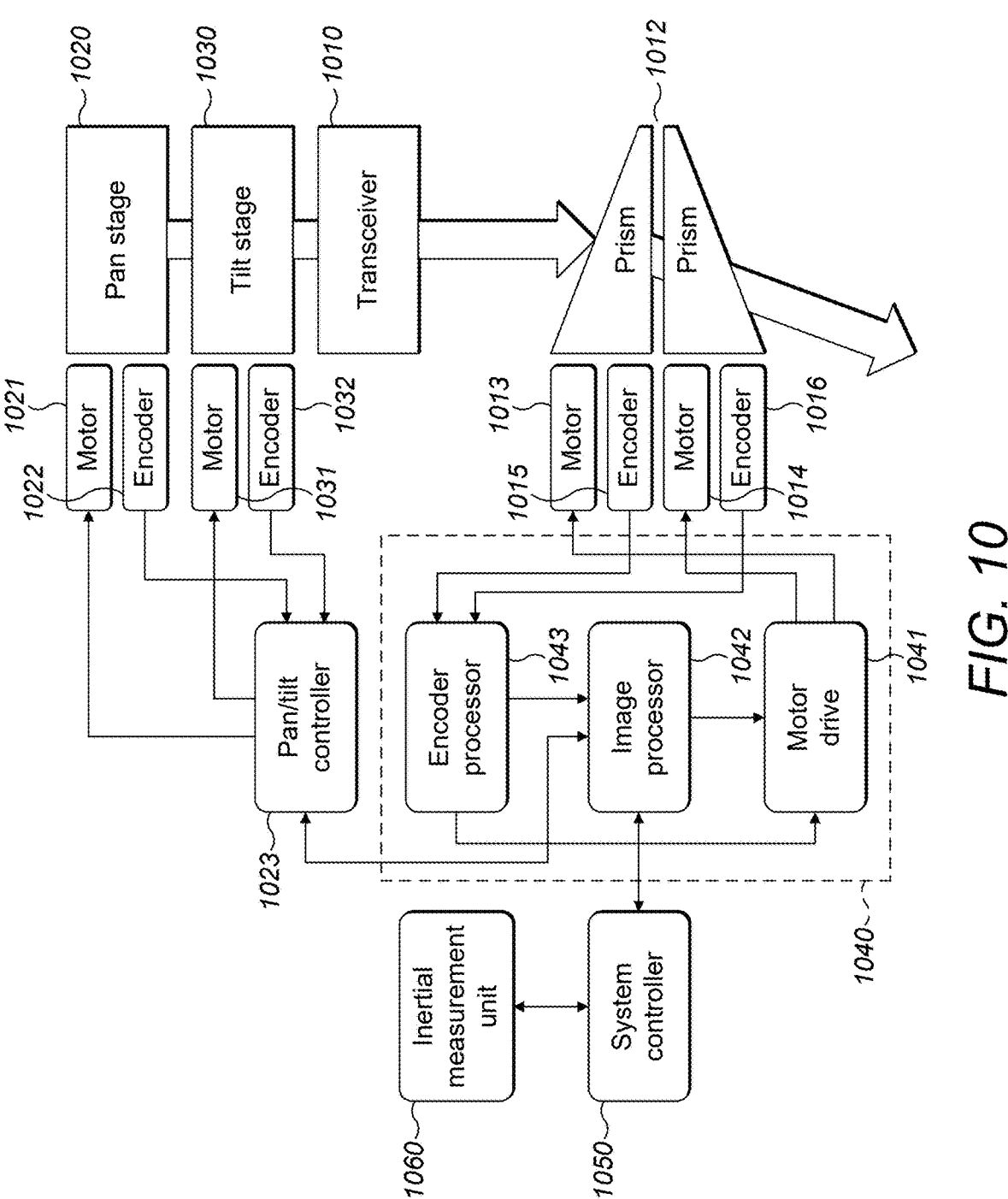
FIG. 10 is a schematic diagram of a gas lidar beam pointing and scanning system.

Thus there is provided here an optical scanner system, an example of which is described further with reference to FIG. 10, that translates the instantaneous narrow field of view of an optical transceiver ("TFOV") around a larger system field of view ("SFOV"). The system may comprise two identical or essentially identical optical prisms which rotate in a controlled manner. Accordingly, some embodiments may include a Risley pair. The SFOV may be defined by the capability of a scanning system to translate, or move, the TFOV. It should be appreciated, however, that the scanning of the TFOV is not limited to the use of a pair of prisms and other scanning mechanisms may be used.

Figures 3A, 3B:
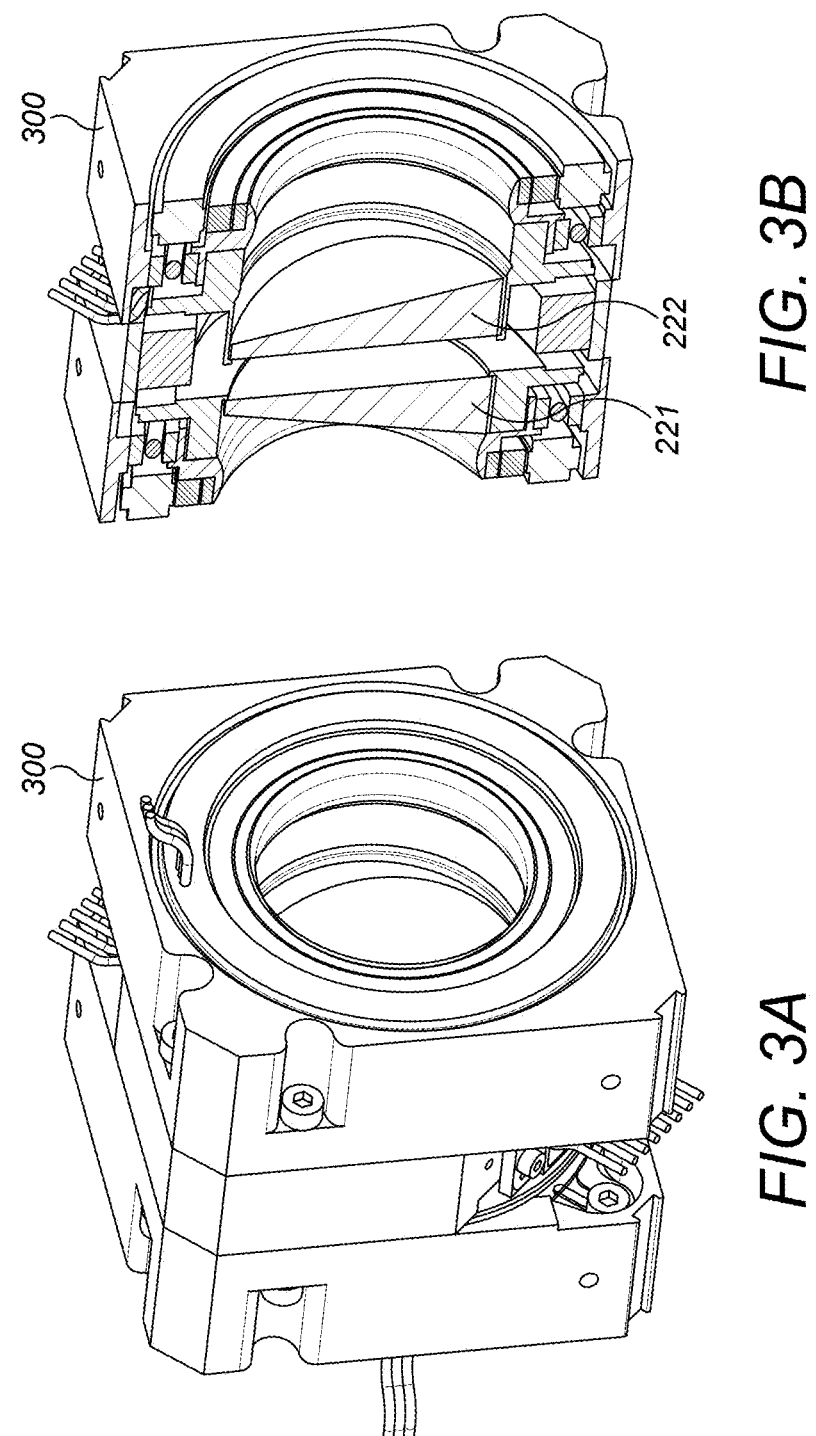
FIGS. 3A and 3B are respectively a perspective and a cut-away view illustrating how dual rotating prisms may be incorporated into a mechanical design.

FIGS. 3A and 3B show how the prisms 221, 222 may be incorporated into a mechanical design. In this example the prisms are provided in a housing 300 that contains rotary electric motors, one for each prism, and magnetic encoders, one for each prism, to track the rotary motion of the prisms.

One function of the optical scanner system, to be described further with reference to FIG. 10, may be to translate the TFOV around the SFOV in order to build up an image. Note that for a coaxially aligned optical transceiver, TFOV is both the field of regard (pointing direction) of the outgoing of the collimated laser pulses, and the field of view of the detector. In other transceivers the TFOV might be one but not the other.

Further, in a method to be described in more detail below, the sensing measurements or image data may be used to determine the presence and location of excess gas in the field of view, e.g. gas present in a concentration above a threshold value. An adjusted system field of view may then be determined in order to obtain sensing measurements at a higher spatial resolution.

Another function of the optical scanner system may be to simply move the TFOV in order to reduce noise due to laser speckle (random spatial interference patterns commonly observed when using a coherent light source). A static TFOV (and static target) is subject to high speckle noise, which impacts the metrological SNR of the sensor; moving the TFOV blurs out the speckle.

In the system of FIG. 1 a tuned radiation wavelength, for example laser light, may be used to detect the gas. In that case the rate of wavelength tuning may be chosen to be sufficiently fast that rapid movement of the laser spot as a result of the scanning does not affect the spectroscopic gas absorption measurements. For example, with the spot moving at a speed greater than 1 m/s across the system field of view a tuning rate of 100 kHz or more may be used.

The optical scanner system may form part of a detection system sensor engine along with the optical transceiver. It may be controlled by motor drive circuitry in the system hardware (electronics), which may interface to a field programmable gate array "FPGA".

Referring again to FIGS. 2A-C. in some embodiments the scanner translates TFOV by rotating its prisms about the transceiver axis (z). By adjusting the relative prism-to-prism angle of the prisms, in other words the orientation of the "wedge" angles, TFOV can be moved to any point within SFOV. The angular pointing of SFOV (interchangeably referred to as the output beam vector) can be determined by the following set of equations [Proc. of SPIE Vol. 6304, 630406, (2006) doi: 10.1117/12.6790].

$$\begin{bmatrix} k_{3x} \\ k_{3y} \\ k_{3z} \end{bmatrix} = \begin{bmatrix} \cos\phi\sin\theta \\ \sin\phi\sin\theta \\ \cos\theta \end{bmatrix} \begin{bmatrix} \beta\sin\alpha + \cos\phi'\sin\alpha\left[\sqrt{1 - n^2 + \gamma^2(\phi')} - \gamma(\phi')\right] \\ \sin\phi'\sin\alpha\left[\sqrt{1 - n^2 + \gamma^2(\phi')} - \gamma(\phi')\right] \\ (1 + \beta\cos\alpha) + \cos\alpha\left[\sqrt{1 - n^2 + \gamma^2(\phi')} - \gamma(\phi')\right] \end{bmatrix}$$

$$\beta = \sqrt{n^2 + \sin^2\alpha} - \cos\alpha$$

$$\gamma(\phi') = \cos\alpha + \beta(\cos^2\alpha + \cos\phi'\sin^2\alpha)$$

In the above, the 1st prism in the pair is at 0° rotation (as in FIG. 2A), and the variables are defined as:

$k_3$ is the vector of the optical beam at the output by the Risley pair, assuming an input beam parallel to the z axis ($k_1$=[0, 0, 1]).

$\theta$ is the polar angle of the output beam $\phi$ is the azimuthal angle of the output beam $\alpha$ is the prism wedge angle $\phi'$ is the relative prism-to-prism angle between the prisms about the optical axis ($\phi'$=0° in FIGS. 2A and 2C, $\phi'$=180° in FIG. 2B)

n is the refractive index of the prisms.

It should be appreciated that the spatial patterns of beam vector depend upon the mode of operation of the scanner. There are four primary considerations when designing scan patterns, one or more of which may be used in any combination depending on the particular requirements of a system:

Speckle noise: minimized by maintaining high beam speed across entire scan pattern.

Averaging: Noise can be reduced by averaging; thus high point density areas will give lower noise. Again, Speckle noise is maximum for low beam speed thus areas of low beam speed could have higher point density to compensate Resolution: resolution is reduced at higher beam speed (motion blur) and increased at higher point density. Thus, an effective scan pattern should have low beam speed where point density is high (and vice versa) since the alternative-high speed and high point density-risks blurring points together.

Mechanical: mechanical simplicity and consistency of the wedge motor motion. Effective scan patterns should have no sudden changes in direction or rapid accelerations that the system hardware cannot handle.

Some of the methods described here are particularly concerned with the resolution of scanning for the purpose of reliably performing gas sensing measurements.

In general the scanning may operate in one or more of 4 modes of operation:

Mode 1: Asynchronous Full FOV

Running the two wedges asynchronously at fixed speeds.

Wedge speeds can be chosen to be significantly different, for example the speed of one can be as little as a tenth of the speed of another, (0.447 Hz vs 1 Hz in a specific example) since this prevents very low speeds (~0 m/s) at the center of the pattern.

Simple scan patterns produce a similar point density distribution. Very high density in the center, lower toward the edges.

However, less than 20% of scan points are in the central 5 m radius of the pattern. Redistributing these points to the edges has minimal effect on average point density.

Thus the inhomogeneous point density is not a serious issue.

Figure 4A:
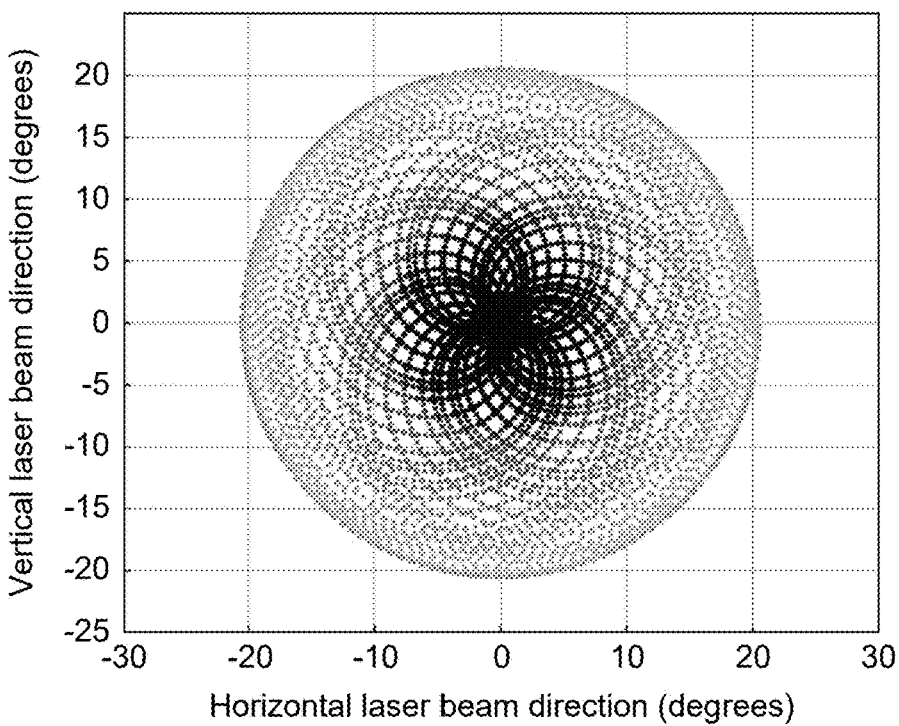
FIGS. 4A and 4B show examples of how an optical beam can be made to scan around a field of view in a variety of different patterns by using dual rotating prisms.
Figure 4B:
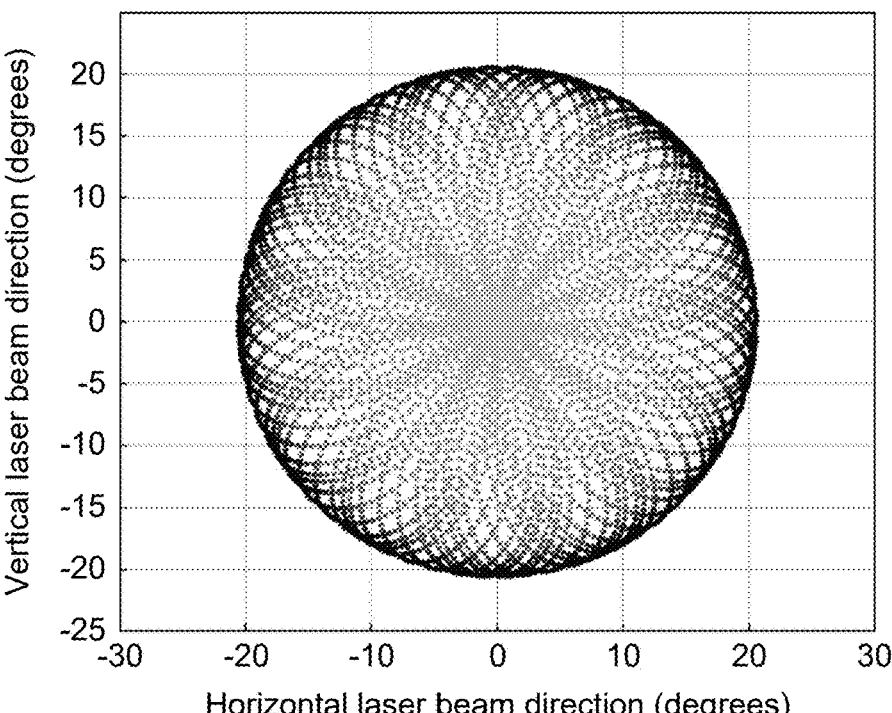

FIGS. 4A and 4B show two examples of beam angular scanning patterns that correspond to Mode 1 described above, e.g. generated by a prism pair rotating asynchronously. In each case lighter shades indicate a faster scan speed. FIG. 4A shows a pattern that may be achieved with prisms rotating in the same direction. FIG. 4B shows a pattern that may be achieved with prisms rotating in opposite directions. In each case the rotation is asynchronous, i.e. the prisms are rotating at different rates.

With different rotation rates a two-prism scan pattern may fill in a circle with, for example, a maximum deflection equal to twice a single prism's deflection.

Wedges rotating in the same direction maximize beam velocity at edges of scan, while wedges rotating in the opposite direction minimize beam velocity at edges of scan.

For full FOV imaging the beam speed may be maximized where point density is low.

Low point density→high noise

High beam speed→low (speckle) noise

Thus wedges rotating in same direction produce an advantageously even sensitivity level across the whole FOV.

On the other hand, spinning the wedges in opposite directions achieves high SNR in the center and low on the edges. However, some embodiments may use scan mode 2 to zoom in on the point of interest (with relative wedge phase control).

Mode 2: Synchronous Circle

When only a small spatial region needs to be scanned, but speckle must be reduced, a synchronous circle pattern may be used. A synchronous circle pattern may be understood as one that is generated by rotating the prisms synchronously together with each other while fixing the relative prism-to-prism angle in a set orientation. This fixed orientation determines the diameter of the SFOV circle.

This scan pattern can then be generated by synchronizing the two prism's rotation such that there is no relative rotation between the wedges—i.e., a fixed relative prism-to-prism angle is maintained. Rotating the two prisms at the same rate will make the output optical beam angle scan in a circle with the rotating prisms. As described in FIG. 2, it is possible to select the angular radius of this circle as two times the single prism deflection angle when the relative prism angle is 0 degrees, as shown in FIGS. 2A and 2C, or to select the angular radius of the circle as zero when the relative prism angle is 180 degrees, as shown in FIG. 2B. Varying the fixed relative prism-to-prism angle will change the angular radius of the output optical beam scan circle to any value between these two limits. Here the term "prism deflection angle" is used to refer to the angle of deflection of the optical beam from the z axis due to the presence of the prism.

Figure 5A:
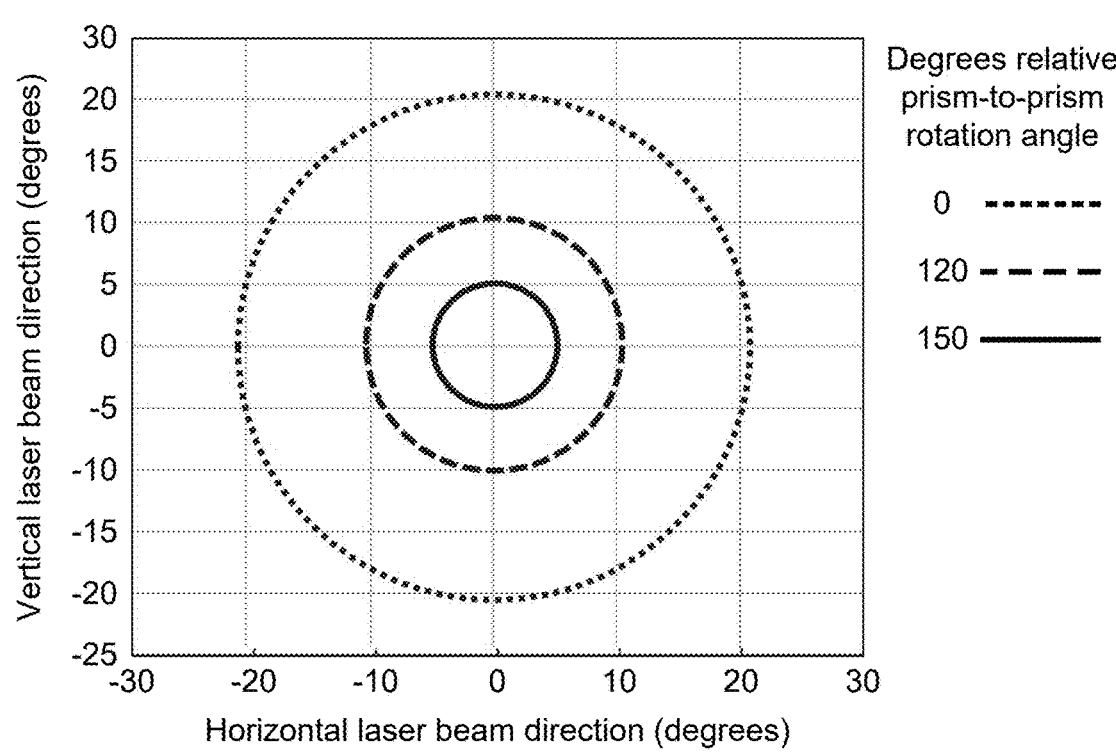
FIGS. 5A and 5B show examples of how an optical beam can be made to scan around in circles with different sizes by using synchronized rotation of dual prisms.
Figure 5B:
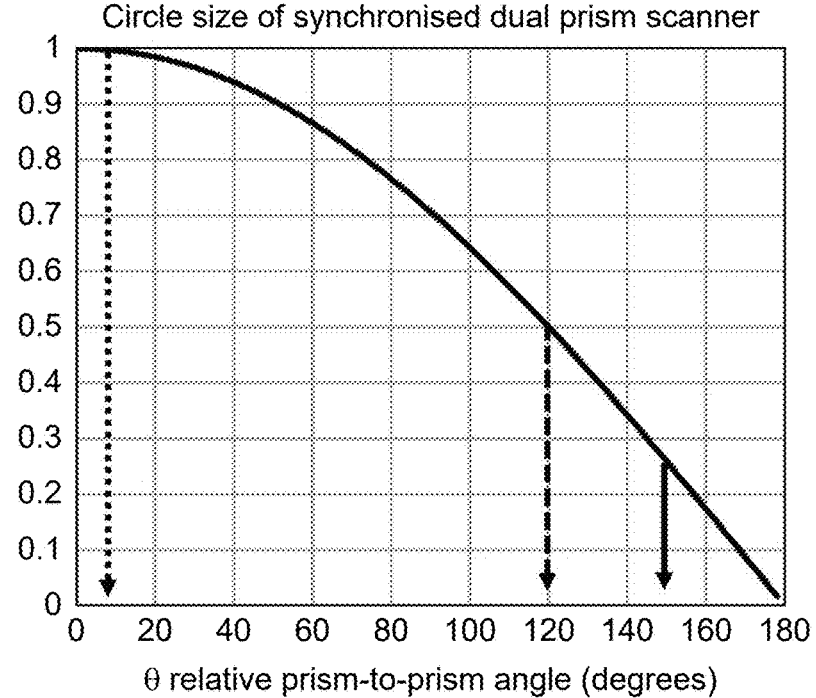

FIGS. 5A and 5B illustrate how optical beam circular scan patterns as described in Mode 2 may be achieved using a synchronous pair of prisms, i.e. rotating in the same direction and at the same rate. With equal rotation rates a two-prism scan pattern forms a simple circle with a deflection that depends on the fixed relative prism-to-prism angle.

FIG. 5A shows different circle scans with different prism-to-prism angles. The example corresponds to a prism pair where one prism deflects an optical beam passing through it by 10 degrees and so two prisms aligned together at 0 degrees relative prism angle deflects an optical beam by 20 degrees. Two prisms with relative prism-to-prism angle of 120 degrees scan a circle with 10 degrees radius, so produce a 2× zoom, and two prisms with relative prism angle of 150 degrees scan a circle with 5 degrees radius and produce a 4× zoom. FIG. 5B is a corresponding graph of relative prism-to-prism angle versus resulting scanned circle size. It will be appreciated from FIGS. 5A and 5B that the TFOV may be translated around a series of circles by changing the fixed relative prism-to-prism angle, for example from one rotation to the next or at different intervals.

Mode 3: Synchronous Zoom

Mode 2 operation creates an optical zoom effect by varying the relative prism-to-prism angle. However open circles like those generated this way are of limited use in optical beam scanning. What is more generally useful is to create scans that completely fill in these smaller zoomed circles without going outside the smaller outer radius.

This may be achieved in various ways, some of which will now be described.

One option is to apply a variable phase shift to the relative prism-to-prism angle of the two prisms. Applying the variable phase shift may involve rotating the two prisms at the same nominal, or average, rate which may be the same as in Mode 2, and modulating the rotation rate of one or both of the prisms in a periodic manner to vary the relative orientation of the prisms, or prism to prism angle. This modulation may include a maximum amplitude so as to limit the range over which the relative prism-to-prism angle can be varied whilst still allowing the scanning of a small circular spatial region with more complete filling in. For example, and building on the previous Mode 2 description, to scan with a zoom factor of 2× compared to asynchronous prism rotation but with a more filled-in field of view the relative prism-to-prism angle would be varied from 180° by plus and minus 60°. This could be achieved by modulating the rotation rate of one of the two prisms with a sinusoidal function having a given period to result in a relative rotation angle that ranges from 120° to 240° or $\phi'=180°*(1+0.333 \sin (t/period))$.

In this example, one prism is rotated at a constant rate and the rate of rotation of the other prism is varied periodically. It will be appreciated that the same effect can be achieved by periodically varying the rate of rotation of both prisms rather than one rotating at a constant rate, for example by varying a relative rate of rotation of one prism with respect to the other. Whether or not one prism rotates at a constant rate, the average or nominal rate of rotation of the two prisms may be the same.

The FOV can be adjusted by changing the amplitude of the sine function, 0.333 in the example above. In some embodiments, one may also use a saw tooth function or similar instead of a sine function. Again, for a fixed synchronous prism rotation rate the speed of the angles scanned is maximized at the high angles at the edges of the pattern.

For a lidar system with a fixed data acquisition rate a smaller optical field of view leads directly to a larger number of data points in any particular spatial area and therefore a corresponding increase in spatial resolution. Mode 3 operation with a reduction in the size of the field of view is therefore higher spatial resolution compared with mode 1. However, beam scanning speed is also lower for the same prism rotation rates, which may impact speckle noise.

Figure 6A:
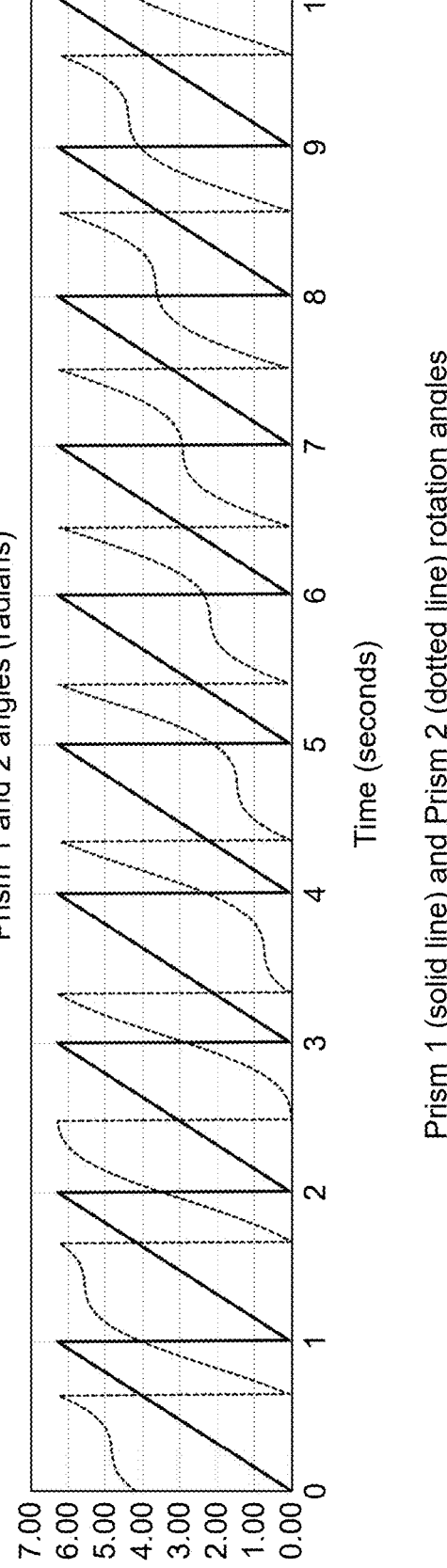
FIGS. 6A-C show an example of how an optical beam can be made to scan around a reduced size field of view by superimposing a sinusoidal oscillation of the relative prism-to-prism angle onto a synchronized rotation of dual prisms.
Figure 6B:
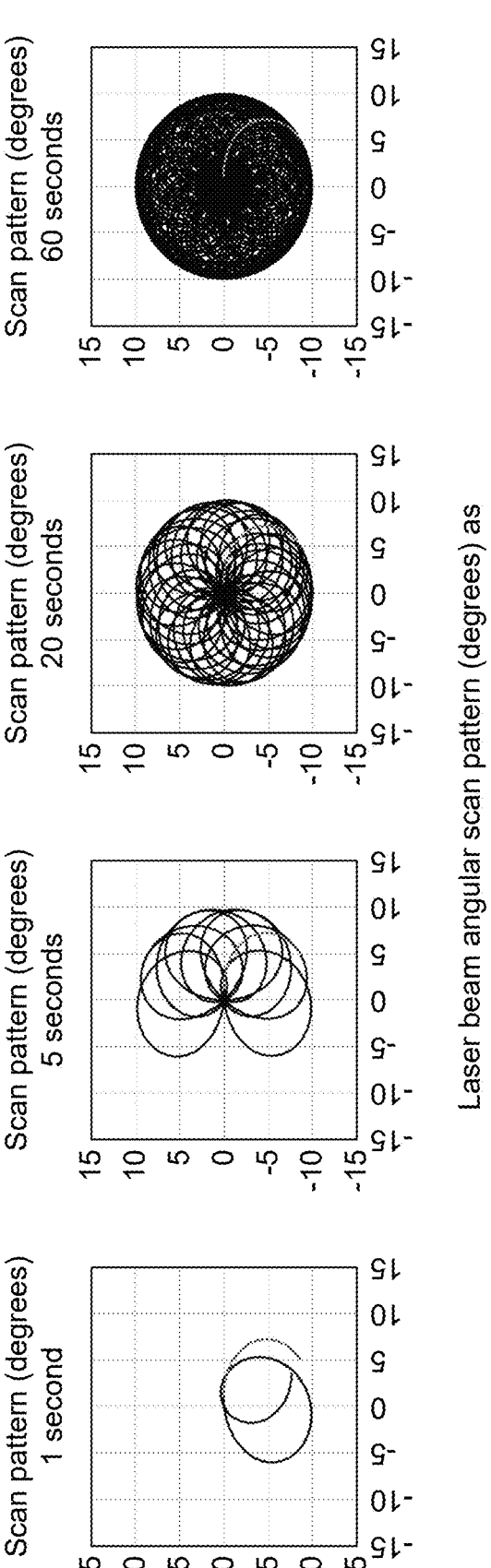
Figure 6C:
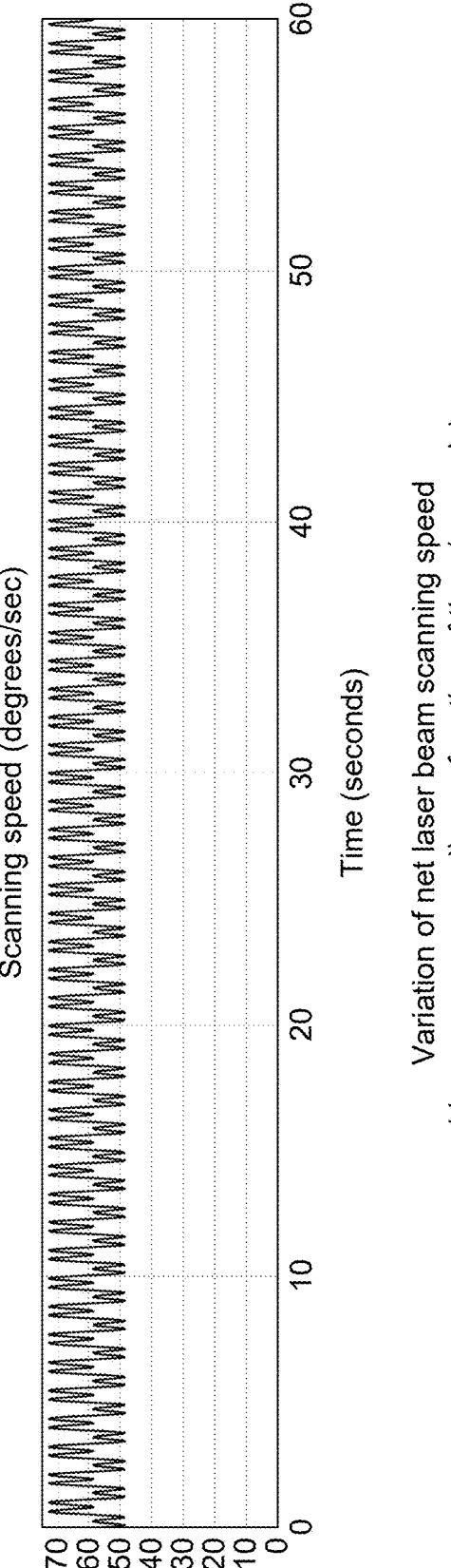

FIGS. 6A-C illustrate an example of a zoom pattern of the type described in mode 3 where the effects of superimposing an oscillation of the relative prism-to-prism angle on top of a synchronous rate of rotation of a prism pair are used to achieve a reduced size scanning pattern. The size of the pattern, i.e. the SFOV, can be adjusted by varying the maximum relative prism-to-prism angle about 180°. This example has that angle change by plus and minus 60° from 120° to 240° and the scan pattern fills in a circle of 10° radius and so has a zoom factor of 2 compared to the asynchronous result in FIG. 4. This example varies the prism-to-prism angle as a sinusoid in time with a period 1.116 times the average or nominal rate of rotation. The period of modulation of the relative rate of rotation of one prism with respect to the other may be kept close to 1 to minimise the variation in scanning speed of the laser beam. We see for instance that for sinusoidal modulation a ratio of modulation period to the period of the average rate of rotation of between 0.6 and 2.0 (i.e. 60% to 200%) times keeps the scanning speed to <50% variation.

FIG. 6 illustrates a zoom of 2× where the radius of the field of view is 10 degrees and not the 20 degrees of the asynchronous mode 1. This zoom factor is adjustable by changing the maximum amplitude of the relative prism-to-prism angle. FIG. 6A shows the variation in the two prism angles over time, FIG. 6B shows the build-up of the fill of the circle in time with the scanned patterns obtained after 1, 5, 20 and 60 seconds, and FIG. 6C shows the resulting scanning speed of the optical beam over the same 60 seconds.

Mode 4: Synchronous Spiral

Another similar approach to mode 3 is using synchronized prisms with a sweeping prism-to-prism angle to draw a spiral trajectory. Spiral patterns are achieved whenever the period of oscillation of the prism-to-prism relative rotation angle is many times longer than the period of the combined synchronous rotation. In other words, the period of the modulation of one of the prism's rotation rates is many times longer than the period of that prism's unmodulated rotation. This may also be understood as meaning that the modulation rate—i.e., the rate of the modulation of one of the prism's rotation rate—is many times slower than that prism's unmodulated rotation rate. We see for instance that for sinusoidal modulation a ratio of modulation period to the period of the average rate of rotation of greater than 6 (i.e. 600%) times produced a spiral scan pattern.

Spiral patterns can therefore be combined with mode 3 to scan with zoom over a smaller target area. However the scanning speed drops and speckle will become large if the rotation rate in the center of the spiral is not increased.

Figure 7A:
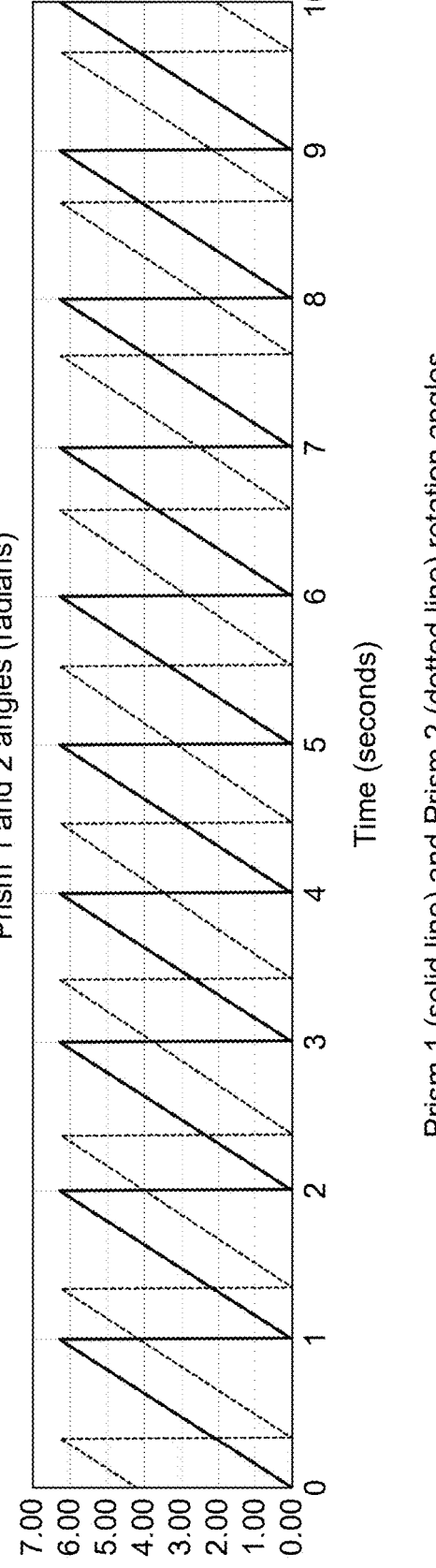
FIGS. 7A-C show an example of how an optical beam can be made to scan around a field of view in a spiral pattern by reducing the rate of the superimposed oscillation of the prism-to-prism angle with respect to the rate of the synchronous rotation of the prism pair.
Figure 7B:
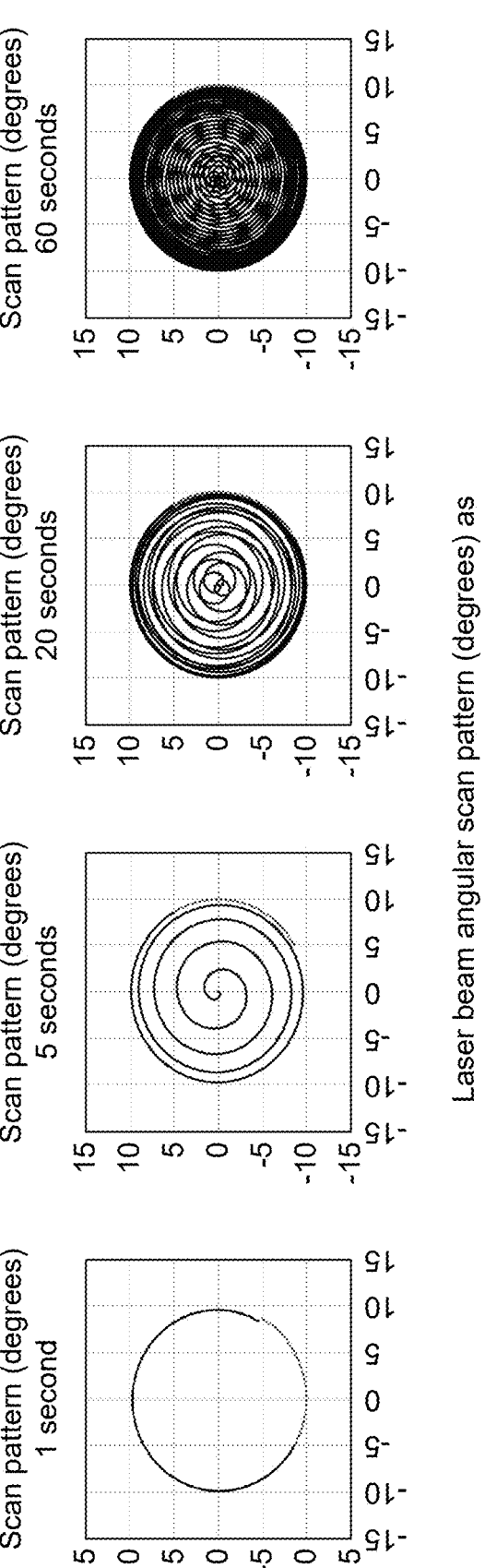
Figure 7C:
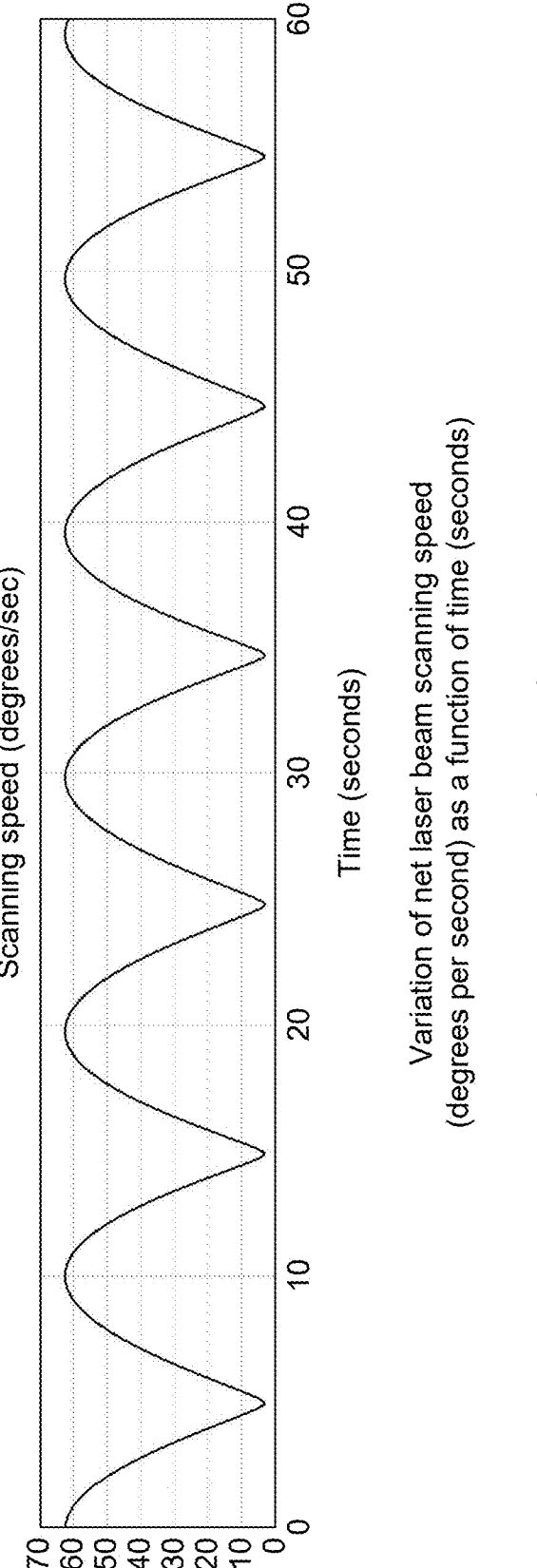

FIGS. 7A-C are illustrations of a spiral scan pattern as described in mode 4. This example is in every way similar to the example shown in FIGS. 6A-C with the single change that the oscillation rate of the relative prism-to-prism angle is now around 20× slower. In this way the reduced size scanning pattern has a spiral shape and a more uniform point density across the SFOV. It does however have a very slow scanning speed of the optical beam in the center of the SFOV.

As with FIGS. 6A-C the relative prism-to-prism angle is varied from 120 to 240 degrees as a sinusoid in time to create a pattern with a zoom factor of 2 compared to asynchronous prism rotation. This example shows the spiral pattern that results with a period of relative prism angle change that is 19.83 times the synchronous rate of prism rotation.

A spiral pattern can allow for uniform sampling of the SFOV and uniform speckle reduction, provided that the speed of the prism rotation is controlled throughout the scan to maintain a constant spot translation speed at the target: The prisms rotate slowly at the outside of the spiral pattern, and then speed up as the pattern approaches the center.

Figure 8A:
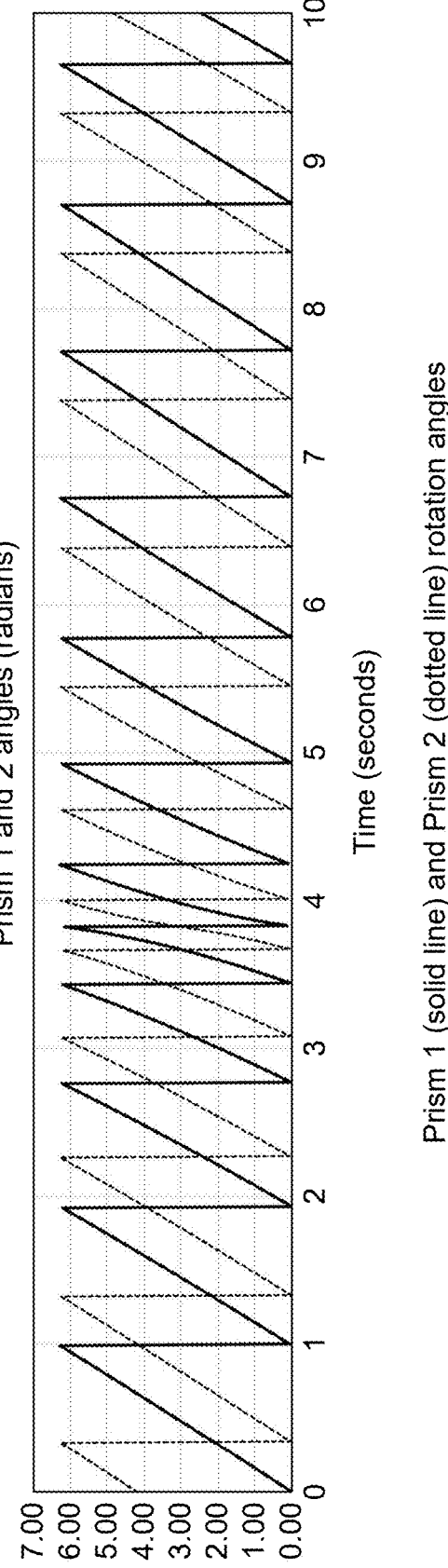
FIGS. 8A-C show an example of how an optical beam being scanned in a spiral pattern can be made to maintain beam scanning speed by increasing the synchronous rotation rate of the prism pair as the scan spirals towards the center of the field of view.
Figure 8B:
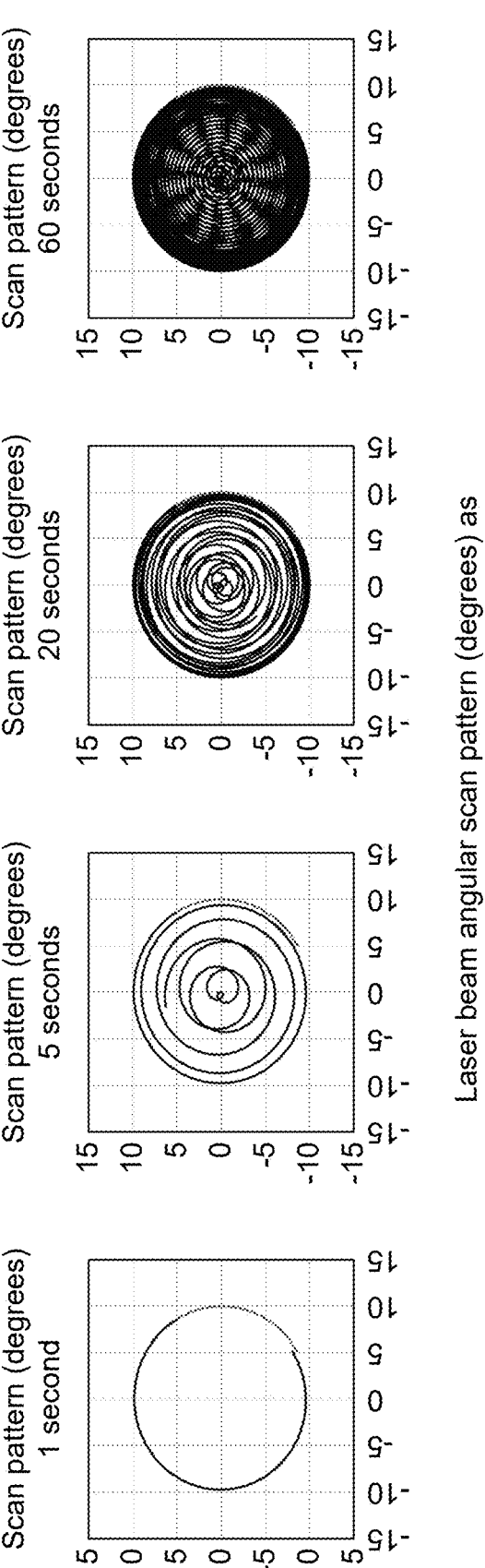
Figure 8C:
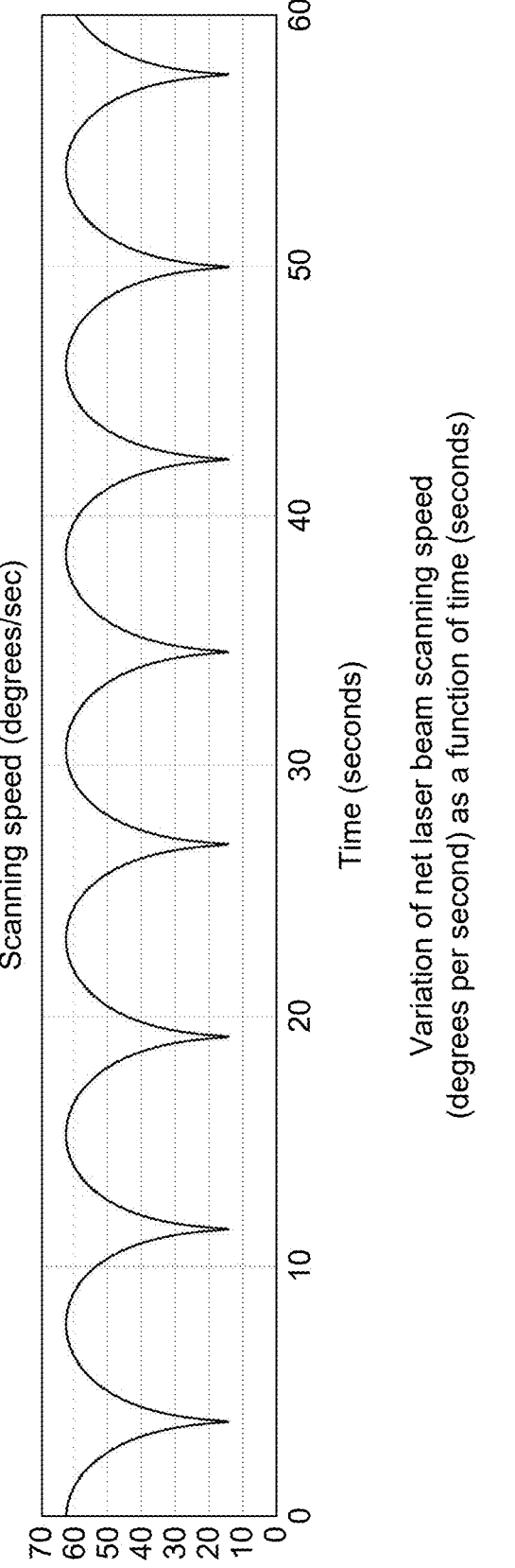

FIGS. 8A-C show a spiral pattern very similar to FIGS. 7A-C but with the additional change that the rate of the synchronous rotation of the prism pair is increased as the pattern spirals into the center so that the minimum scanning speed of the optical beam is substantially increased.

As described with mode 3, limiting the range of this relative prism angle allows a variable optical zoom, and as with mode 3, by reducing the outer radius of the pattern whilst maintaining the number of sampled points per scan and spot translation speed at the target, mode 4 operation allows for higher spatial resolution compared with mode 1.

Point density uniformity of a scan created by mode 3 or mode 4 is a function of how much successive sweeps of the scan overlap spatially. This overlap can be high and large gaps in the scan pattern can occur if the ratios of synchronous and relative prism rotations are regular factors. In FIGS. 6A-C, 7A-C, and 8A-C these ratios have been chosen particularly to minimize this overlap and create a more uniform pattern fill. This uniformity may be further increased by adding random or regular timing variations to parts of the interleaved trajectories. For instance is also possible to further increase sampling coverage (and speckle reduction) by adding additional dither motion to the spiral pattern.

To mitigate effects of Hardware/Mechanical limitations on prism rotation acceleration, where the trajectory reverses or change direction, patterns may be used in which there is no sudden reversal of direction at high speed.

Figure 9A:
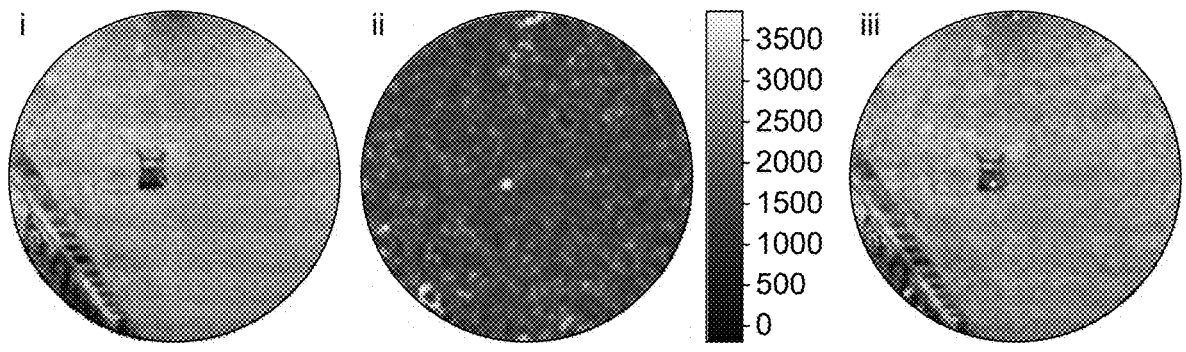
FIGS. 9A-C show a series of images obtained with a lidar gas detection system with different fields of view created by a dual rotating prism scanner.
Figure 9B:
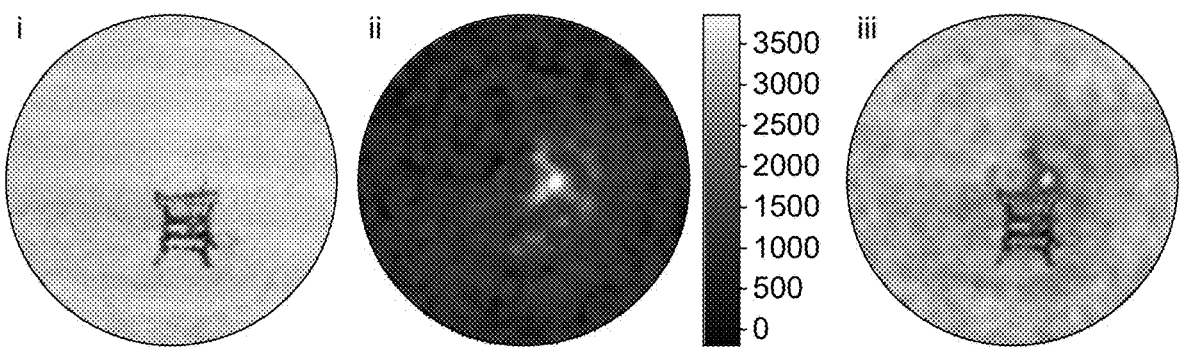
Figure 9C:
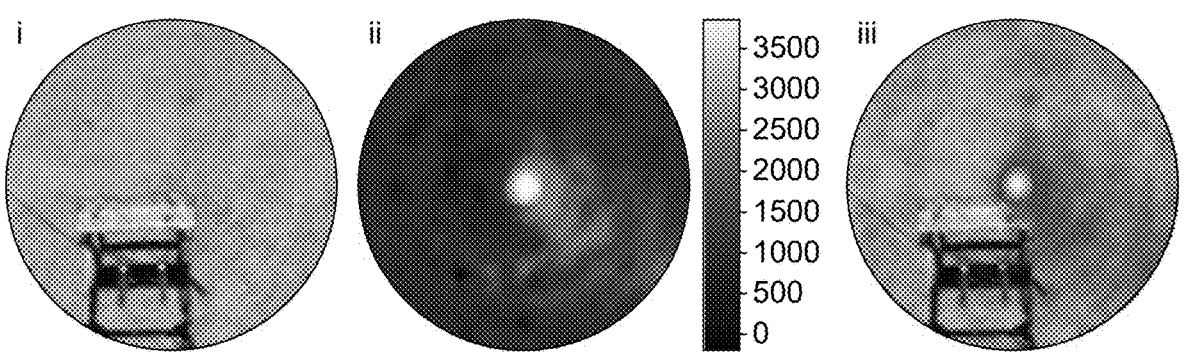

FIGS. 9A-C show gas lidar images acquired with different system fields of view, varied using the techniques described in Mode 4 above. In each row, from left to right, the first image shows the lidar scatter return intensity and therefore contains information relating to solid structures in the field of view. The second image shows gas concentration pathlength, determined for example using any method known in the art, with the scale in ppm·m (parts per million gas times optical pathlength) shown adjacent. The third image shows gas concentration pathlength overlaid on reflected intensity. This enables the source of the gas to be identified relative to the solid structures. To obtain the images a pipe with a constant flow of methane from a nozzle was held in a workbench so the gas was directed up into the air. This was imaged with a lidar gas detection system at various zoom levels. Notably the images of FIGS. 9A-C may be obtained using one laser. In other words, the same laser may be used to form an image of the solid structures as well as to sense gas in the atmosphere around the solid structures. Further, this information may be obtained in the same scan of the system field of view. Therefore any of the methods described here may comprise performing a spatially scanned lidar measurement of a) ranges to surfaces and b) gas concentration pathlength, wherein these are measured over the same distances to the same surfaces across a field of view. Then the position of any cloud of excess gas above the background in that field of view may be determined and the spatial scan's field of view, i.e. the system field of view, may be adjusted to improve the resolution of the measurement of the cloud of excess gas. Importantly the adjustment may be based on the gas sensing measurements alone.

FIG. 10 is a schematic diagram of a gas lidar scanning system that may be used to implement any of the methods described here. The system of FIG. 10 may be incorporated into the gas lidar detection system of FIG. 1.

The scanning system comprises a transceiver 1010 which may for example comprise the laser device 4, the detector 22 and guide elements 28 of the system of FIG. 1. The system of FIG. 10 further comprises an optical system 1012 corresponding to optical system 26 of FIG. 1, shown here to comprise a pair of prisms as described above. The optical system 1012 may comprise additional components such as but not limited to lenses as will be understood by those skilled in the art.

The transceiver 1010 may be mechanically fixed with respect to the optical system 1012 and controlled by pan and tilt stages 1020, 1030 to point the transceiver 1010 at a target area for transmission and reception of laser radiation. The pan and tilt stages 1020, 1030 may be driven by respective motors 1021, 1031 under the control of pan/tilt controller 1023. Position signals from the pan and tilt stages 1020, 1030 may be generated by respective encoders 1022, 1032 and fed back to the pan/tilt controller 1023.

The optical system 1012 may be operated as described above to scan the laser over the target area within a system field of view. This may be defined by the rotation of the prisms as described above to achieve a desired coverage and/or resolution. For this purpose a respective motor 1013, 1014 is provided to drive each prism whereby the two prisms may be rotated together (synchronously) or with respect to each other. Position signals from the prisms may be generated by respective encoders 1015, 1016 and fed back to a scanning control system 1040. The scanning control system 1040 may be implemented in software and may comprise motor drive 1041 configured to send drive signals to motors 1013, 1014, an image processor 1042 whose function is described further below, and encoder processor 1043 configured to process signals from the encoders 1015, 1016.

The image processor 1042 is configured to send and receive signals from a system controller 1050. The system controller 1050 is also configured to send and receive signals from an inertial measurement unit 1060.

The system controller 1050 and the pan/tilt controller 1023 may form part of the control element 8 of FIG. 1.

The system of FIG. 10 may operate as a lidar system that simultaneously with one laser determines the distance to a remote surface and the gas absorption of laser light over the distance to the surface, for example as shown in FIGS. 9A-C. The system may comprise transceiver configured to transmit and receive the laser light that is used for range and gas measurement, as described with reference to FIG. 1. As shown in FIG. 10 a laser beam scanner is provided comprising multiple encoders 1015, 1016 configured to indicate the direction of the spatially scanned laser light that is used for range and gas measurement, and a set of processors 1043, 1040 configured to process data from the multiple encoders in the scanner and generate spatially registered range and gas concentration data.

The system of FIG. 10 may be configured to implement a method of operating a lidar system for detection of a gas, now described with reference to FIG. 11.

Figure 11:
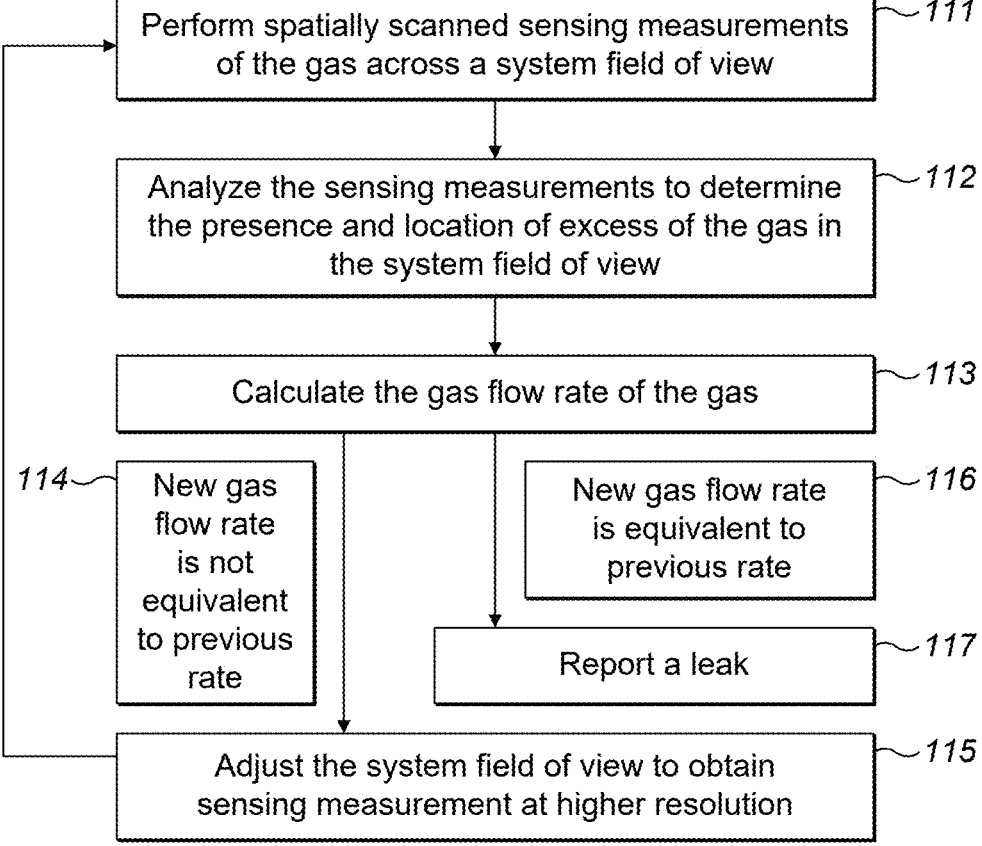
FIG. 11 is a flowchart of a method of operating a lidar gas detection system.

At operation 111 in FIG. 11, spatially scanned sensing measurements of the gas are performed across a system field of view. This may be a system field of view used for regular monitoring of possible gas leaks for example. In order to achieve this the lidar may be scanned using rotating prisms as described above, for instance as in Mode 1 or Mode 3 or Mode 4, and the system field of view may therefore be defined by the scan pattern. From these measurements it is possible to measure gas concentration pathlength across a field of view where there is a potential for a gas leak.

At operation 112, the lidar sensing measurements are analyzed to determine the presence and location of any excess gas in the field of view, for example determined by the gas concentration pathlength being above a certain threshold and optionally over a predetermined area. In other words, areas in the system field of view with gas concentration above background and/or noise levels, for example represented by a threshold, may be identified. This may be achieved by forming a gas concentration image for example by System Controller 1050, to identify areas that indicate an excess gas cloud (e.g. above threshold area) and/or a gas leak (smaller area, above threshold concentration pathlength).

Following the analysis in operation 112, based on the determined location, an adjusted system field of view is determined and then spatially scanned sensing measurements of the gas are performed across the adjusted system field of view to obtain sensing measurements at higher spatial resolution. In the method shown in FIG. 11 this is done in multiple operations and used to verify measurements of the leak rate calculation.

Broadly, the method may comprise calculating a gas flow rate from the sensing measurements after each spatial scan at operation 113, comparing successive flow rate measurements at operations 114 and 116, and repeating the performing and analyzing until the flow rate measurements converge on a consistent value, e.g. are within a predetermined margin.

Thus at operation 113 in FIG. 11 a gas flow rate is determined. This may be done in a manner known in the art, for example using the gas concentration image of the kind shown in FIGS. 9A ii, 9B ii, and 9C ii, the range image as shown in FIGS. 9A i, 9B i, and 9C i, and the wind speed.

In operations 114 and 116 it is determined whether the gas leak rate is equivalent, e.g. within a predetermined range of, a previously determined leak rate. If it is not, as determined at operation 114, this further confirms a likely leak that should be investigated more closely. Therefore at operation 115 the system field of view size is adjusted, for example as shown in FIGS. 9A-C to improve the resolution of the measurement of excess gas. Additionally or alternatively the pan and tilt of the system may be adjusted so that areas of excess gas are more completely imaged.

Operations 114 and 115 may be repeated until the measurement of gas flow rate is consistent, as determined at operation 116 where gas flow rate calculated at operation 113 is equivalent to the previously calculated flow rate. At this point a leak may be reported at operation 117, where the gas concentration image and the gas flow rate may be recorded.

In some embodiments of the present invention, the methods and/or algorithms described herein may be implemented by suitable configuration of a computing system in an existing device. In other embodiments, measurement results may be received at a computing system from a lidar device and processed to determine gas concentration path.

A system as described herein may comprise a computing system or device. Such a system or device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer readable medium. Computer-readable media may be non-transitory and include, for example, computer readable storage media. Computer readable storage media may include volatile or non-volatile, removable or non-removable media implemented in any method or technology for storage of information such as computer readable instructions, data structures, program modules or other data. A computer readable storage medium can be any available storage medium that may be accessed by a computer. By way of example, and not limitation, such a computer readable storage medium may comprise a RAM, a ROM, an EEPROM, a flash memory or other memory device, a CD-ROM or other optical disc storage, a magnetic disc storage or other magnetic storage device, or any other medium that can be used to carry or store desired program code in the form of instructions or data structures and that can be accessed by a computer. A computer readable storage medium and/or computer readable storage media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, or in addition, the functionality described herein can be performed, at least in part, by one or more hardware logic components. For example, and without limitation, hardware logic components that can be used may include Field-programmable Gate Arrays ("FPGAs"), Program-specific Integrated Circuits ("ASICs"), Program-specific Standard Products ("ASSPs"), System-on-a-chip systems ("SOCs"). Complex Programmable Logic Devices ("CPLDs"), etc.

Although illustrated as a single system, it is to be understood that the computing device may be a distributed system. Thus, for instance, several devices may be in communication by way of a network connection and may collectively perform tasks described as being performed by the computing device.

It will be appreciated that a computing device as described here may be located remotely and accessed via a network or other communication link (for example using a communication interface).

The term "computer" is used herein to refer to any device with processing capability such that it can execute instructions. Those skilled in the art will realize that such processing capabilities are incorporated into many different devices and therefore the term 'computer' "computer" includes PCs, servers, mobile telephones, personal digital assistants and many other devices.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

While the methods are shown and described herein may be series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

It will be understood that the above description is given by way of example only and that various modifications may be made by those skilled in the art. What has been described above includes examples of one or more embodiments. It is, of course, not possible to describe every conceivable modification and alteration of the above devices or methods for purposes of describing the aforementioned embodiments, but one of ordinary skill in the art can recognize that many further modifications and permutations of various embodiments are possible. Accordingly, while one or more embodiments of the invention have been illustrated and described in detail in the drawings and foregoing description, the same is to be considered as illustrative and not restrictive in character, it being understood that only certain embodiments have been shown and described and that all changes and modifications that come within the spirit of the inventions are desired to be protected.

One or more of the features of the appended claims may be implemented in any combination in order to implement an embodiment of the invention.

It is not a requirement of any embodiment of the invention, unless otherwise stated, to perform the steps of the method in a particular order.

What is claimed is:

1. A lidar system, comprising:
a lidar light transceiver;
an optical beam scanner including a plurality of encoders configured to generate encoder data corresponding to a direction of spatially scanned light; and
at least one of a processor configured to process the encoder data and generate spatially registered range and gas concentration data based thereon and a set of processors configured to cooperate to process the encoder data and generate the spatially registered range and gas concentration data based thereon,
wherein the lidar light transceiver, the optical beam scanner, and the at least one of the processor and the set of processors are operably coupled and configured to cooperate to determine, based on a first optical beam, a distance to a remote surface, and determine, based on the first optical beam, a gas absorption of the spatially scanned light over the distance.

2. The lidar system of claim 1, wherein the lidar light transceiver includes a laser device operable to output first output radiation having a continuous wave output, wherein the lidar light transceiver includes at least one detector configured to receive scattered radiation, and wherein the lidar light transceiver includes at least one optical guide element configured to guide the received scattered radiation to the at least one detector.

3. The lidar system of claim 1, wherein the lidar light transceiver is mechanically fixed with respect to the optical beam scanner, and wherein the lidar light transceiver includes pan and tilt stages to point the lidar light transceiver at a target area for transmission and reception of laser radiation.

4. The lidar system of claim 1, wherein the optical beam scanner includes a plurality of prisms.

5. The lidar system of claim 4, wherein the optical beam scanner includes a plurality of drive motors, and wherein each of the drive motors is operably coupled to a respective one of the prisms to rotationally drive the respective one of the prisms.

6. The lidar system of claim 1, further comprising:

a system controller operably coupled to the at least one of the processor and the set of processors to receive the spatially registered range and gas concentration data therefrom; and an image processor operably coupled to the system controller to send first signals thereto and receive second signals therefrom, wherein the system controller is configured to form a gas concentration image based on the spatially registered range and gas concentration data.

7. The lidar system of claim 1, further comprising:

a controller configured to:

control the optical beam scanner to perform first spatially scanned sensing measurements of a gas across a system field of view at a first spatial resolution, form a gas concentration image from analyzing the sensing measurements, determine presence and location of excess of the gas in the system field of view based on the gas concentration image, determine an adjusted system field of view based on the determined location, and control the optical beam scanner to perform second spatially scanned sensing measurements of the gas across the adjusted system field of view at a second spatial resolution.

8. The lidar system of claim 7, wherein the controller is further configured to:

control the optical beam scanner to perform a spatially scanned lidar measurement of ranges to surfaces and corresponding gas concentration pathlength.

9. The lidar system of claim 1, wherein the lidar light transceiver, the optical beam scanner, and the at least one of the processor and the set of processors are operably coupled and configured to detect a concentration of a greenhouse gas.

10. The lidar system of claim 1, wherein the lidar light transceiver, the optical beam scanner, and the at least one of the processor and the set of processors are operably coupled and configured to locate and quantify at least one of: methane and carbon dioxide.

11. The lidar system of claim 1, wherein the lidar light transceiver, the optical beam scanner, and the at least one of the processor and the set of processors are operably coupled and configured to locate and quantify at least one of: ammonia and carbon dioxide.

* * * * *